United States Patent
De Jong et al.

(10) Patent No.: US 10,196,882 B2
(45) Date of Patent: Feb. 5, 2019

(54) GAS WELL DELIQUIFICATION

(71) Applicant: NEDERLANDSE ORGANISATIE VOOR TOEGEPAST-NATUURWETENSCHAPPELIJK ONDERZOEK TNO, s-Gravenhage (NL)

(72) Inventors: Arjen T. De Jong, 's-Gravenhage (NL); Garrelt Jan Niels Alberts, 's-Gravenhage (NL)

(73) Assignee: NEDERLANDSE ORGANISATIE VOOR TOEGEPAST-NATUURWETENSCHAPPELIJK ONDERZOEK TNO, 'S-Gravenhage (NL)

( * ) Notice: Subject to any disclaimer, the term of this patent is extended or adjusted under 35 U.S.C. 154(b) by 207 days.

(21) Appl. No.: 15/118,515

(22) PCT Filed: Feb. 17, 2015

(86) PCT No.: PCT/NL2015/050099
§ 371 (c)(1),
(2) Date: Aug. 12, 2016

(87) PCT Pub. No.: WO2015/122775
PCT Pub. Date: Aug. 20, 2015

(65) Prior Publication Data
US 2017/0051587 A1     Feb. 23, 2017

(30) Foreign Application Priority Data

Feb. 17, 2014   (EP) ..................................... 14155421

(51) Int. Cl.
| | | |
|---|---|---|
| *E21B 43/12* | (2006.01) | |
| *E21B 43/38* | (2006.01) | |
| *E21B 37/00* | (2006.01) | |
| *B01J 20/04* | (2006.01) | |
| *B01J 20/10* | (2006.01) | |
| *B01J 20/20* | (2006.01) | |
| *B01J 20/18* | (2006.01) | |

(Continued)

(52) U.S. Cl.
CPC ........... *E21B 43/122* (2013.01); *B01J 20/045* (2013.01); *B01J 20/046* (2013.01); *B01J 20/103* (2013.01);
(Continued)

(58) Field of Classification Search
CPC ................................. E21B 43/34; E21B 43/38
See application file for complete search history.

(56) References Cited

U.S. PATENT DOCUMENTS 2,948,352 A * 8/1960 Walker .................... E21B 43/34
                                                            95/250
3,172,474 A    3/1965 Siegele
(Continued)

OTHER PUBLICATIONS

International Search Report and Written Opinion for International Application No. PCT/NL2015/050099. (dated Jul. 8, 2015) (9 pages).

*Primary Examiner* — Blake E Michener
(74) *Attorney, Agent, or Firm* — Lucas & Mercanti, LLP

(57) ABSTRACT

A method for gas well deliquification, an installation for gas well deliquification, and a granular sorbent material are provided. The gas well deliquification method includes introducing granular sorbent material in a gas well having liquid to be removed and/or vapor thereof; contacting the granular sorbent material with the liquid and/or vapor thereof in the gas well, thereby causing sorption of at least part of the liquid and/or vapor thereof by the granular sorbent material; and lifting of the granular sorbent material with sorbed liquid and/or vapor thereof at least partly by the gas stream to a wellhead of the gas well.

21 Claims, 4 Drawing Sheets

(51) Int. Cl.
*B01J 20/22* (2006.01)
*B01J 20/26* (2006.01)
*B01J 20/28* (2006.01)
*E21B 41/02* (2006.01)

(52) U.S. Cl.
CPC ............... *B01J 20/18* (2013.01); *B01J 20/20* (2013.01); *B01J 20/226* (2013.01); *B01J 20/26* (2013.01); *B01J 20/28016* (2013.01); *B01J 20/28047* (2013.01); *E21B 37/00* (2013.01); *E21B 41/02* (2013.01); *E21B 43/38* (2013.01)

(56) References Cited

U.S. PATENT DOCUMENTS

| | | | |
|---|---|---|---|
| 3,205,946 A * | 9/1965 | Prats | C09K 8/572 166/288 |
| 4,619,769 A * | 10/1986 | Gritters | B01D 24/4631 210/498 |
| 5,339,905 A | 8/1994 | Dowker | |
| 5,384,343 A * | 1/1995 | Farrar | C10L 9/10 523/129 |
| 6,222,091 B1 * | 4/2001 | Beihoffer | A61F 13/15203 604/358 |
| 7,556,739 B1 * | 7/2009 | Johnston-Dhuet | C02F 1/28 210/664 |
| 9,758,417 B2 * | 9/2017 | Pruett | C02F 11/127 |
| 9,896,903 B2 * | 2/2018 | Fonseca Ocampos | E21B 33/138 |
| 2010/0204066 A1 * | 8/2010 | Ivan | E21B 21/068 507/103 |
| 2012/0205126 A1 | 8/2012 | Chenoweth | |
| 2012/0247779 A1 | 10/2012 | Veeken | |
| 2015/0267871 A1 * | 9/2015 | Murray, Sr. | C10L 3/00 137/1 |
| 2016/0194553 A1 * | 7/2016 | Smith | C09K 8/62 166/300 |

* cited by examiner

GAS WELL DELIQUIFICATION

CROSS-REFERENCE TO RELATED APPLICATIONS

This application is a 371 of PCT/NL2015/050099, filed Feb. 17, 2015, which claims the benefit of European Patent Application No. 14155421.2, filed Feb. 17, 2014.

FIELD OF THE INVENTION

The invention relates to a method for gas well deliquification, an installation for gas well deliquification, and uses of a granular sorbent material.

BACKGROUND OF THE INVENTION

Gas well deliquification is an important technology for exploitation of mature gas wells. As a gas well matures, the reservoir pressure will decline. As a result thereof, the gas velocity in the production tubing will decrease, which can lead to liquid loading. Liquid loading refers to accumulation of liquid components, such as water and condensed hydrocarbons, in gas wells with insufficient gas flow to lift the accumulated liquid to the wellhead. Liquid loading may cause the well to produce the gas erratically; such as in slug flow or churn flow, at a much lower flow rate. Liquid loading can eventually cause production to cease. Estimated is that about 80% of the approximately 500 000 United States gas wells and about 30% to 40% of the Dutch gas wells are affected by liquid loading. In particular, many offshore wells are abandoned due to liquid loading problems. For this reason, gas well deliquification is used to increase the lifetime of gas wells by preventing or mitigating the liquid loading problem.

Common gas well deliquification methods include intermittent production, gas lift, wellhead compression, velocity strings to increase gas velocity, pumps or plungers to lift the liquid to the wellhead, and foamers. Each of these methods has its own disadvantages, including high operating and/or capital expenditures, regulatory and environmental issues and limited effectiveness in extending well lifetime. Accordingly, a gas well deliquification method that is more robust, simple, energy efficient and/or environmental friendly is highly desired.

US-A-2012/0 205 126 describes a process for dewatering a gas well that comprises using an on-site nitrogen generator that can deliver enough nitrogen to force water out of the well.

U.S. Pat. No. 5,339,905 describes a dewatering method for a gas well wherein the water level in the well is lowered by locating the lower end of a dewatering conduit below the water level in the well, and placing the upper end in fluid communication with a water exhaust line at the surface.

US-A-2012/0 247 779 discloses a method for inhibiting liquid loading, in an oilfield tubular. The method comprises treating at least part of an inner surface of the tubular to inhibit the creation of a liquid film and to promote the transport of liquid as droplets while minimising contact with said inner surface. The treatment can comprise providing at least part of the inner surface of the oilfield tubular with a hydrophobic fluoridated hydrocarbon coating comprising polymerised acrylic compounds. Some of the disadvantages of this method are the durability of such compounds in a gas well, risk of contamination, and the costs.

Also, foamers are sometimes used for gas well deliquification. For example, U.S. Pat. No. 3,172,474 discloses the use of sulphonated N-higher alkyl propionamides as foaming agents effective in removing fluids from oil or gas wells. Disadvantages of such foamers include environmental issues, risk of contamination, a need for defoaming, and that they are less suitable for gas wells with high condensate fractions. In addition, foamers have the disadvantage that their effectiveness is affected by brine salinity, condensate chemistry and temperature.

SUMMARY OF THE INVENTION

Therefore, an objective of the present invention is to provide a gas well deliquification method that addresses the above mentioned disadvantages at least in part.

The present inventors found that this was possible by using a sorption-based gas deliquification method.

Therefore, in a first aspect, the invention relates to a gas well deliquification method, comprising
    introducing granular sorbent material in a gas well comprising liquid to be removed and/or vapor thereof,
    contacting said granular sorbent material with said liquid and/or vapor thereof in said gas well, thereby causing sorption of at least part of said liquid and/or vapor thereof by said granular sorbent material, and
    lifting of granular sorbent material with sorbed liquid and/or vapor thereof at least partly by the gas stream to a wellhead of said gas well.

Advantages of such method include that it is relatively robust, cheap, environmentally friendly, energy efficient and simple. The invention allows for a delay in or prevention of liquid loading of a gas well, for example of the build-up of liquid films on a wall of a gas well. The method can allow for a more controlled pressure drop.

Figure 1:
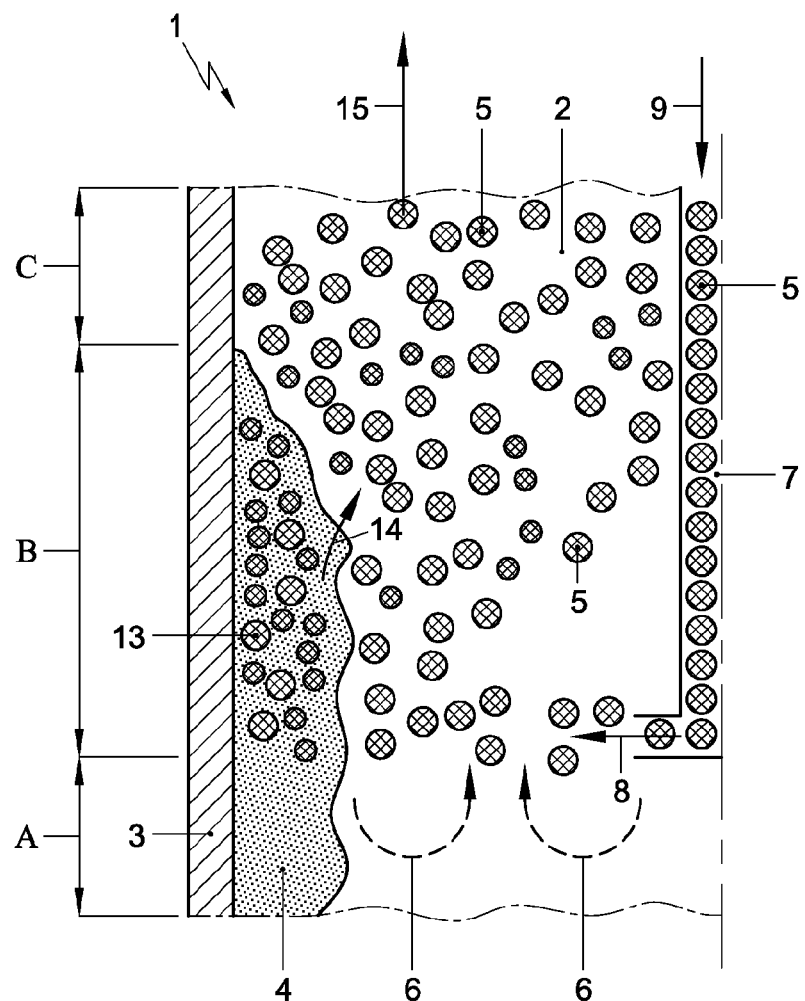
FIG. 1 is a schematic illustration of a gas well during a process in accordance with the invention.

The method is based on a completely new approach to gas well deliquification as it is sorption-based. The new gas well deliquification technology that is fundamentally different from the known methods and advantageously can open a new field of gas well deliquification. The method may render exploitation economically viable of gas wells that are not economically viable due to liquid loading with known gas well deliquification methods. The same applies for other aspects of the invention, including the installation and use. Additionally, the method can also be combined with the current methods, for instance with gas lift, to increase the ultimate recovery of a liquid loaded gas well.

Without wishing to be bound by way of theory, it is believed that contacting liquid (or vapor thereof) with sorbent material allows for control of the size of the particles that have to be lifted by the gas flow, because this particle size is determined at least in part by the used granular sorbent material. The wetted granules of sorbent material typically act as droplets of the liquid that can be lifted by the gas flow. The same applies for sorption of vapor from the gas well by the sorbent material, thereby reducing condensation of such vapor in the gas well.

This controlled particle size allows to ensure that the sorbent granules, with sorbed liquid (and/or vapor thereof), can be lifted by the given gas flow of the gas well. Accordingly, use of a sorbent allows adapting the size of the particles to be lifted up in the gas well to the velocity of the gas flow of the gas well. For more mature gas wells, smaller sorbent particles can be used. As small particles have a relatively high external surface area per mass compared to sorbed liquid and/or vapor thereof, they experience more drag by the gas flow, relative to their mass, and can be carried up by gas flows with lower velocities, even if the gas flow velocity would not be sufficient to prevent liquid loading in the absence of the sorbent material.

As a further advantage, heat of sorption (heat of absorption and/or heat of adsorption) released by the sorption of liquid by some sorbent materials may increase the temperature of the gas stream, thereby increasing the gas flow rate and gas velocity, resulting in increased lifting capacity and improved liquid transport.

The term "granular material", as used in this application, is meant to refer to a material in the form of a plurality of discrete solid elements, for example particles and grains. The constituents that compose granular material (the grains) are typically large enough such that they are not subject to thermal motion fluctuations. Thus, a preferred lower size limit for grains in granular material is 1 m, for example measured as 90 wt. % retention by sieving analysis. On the preferred upper size limit of the grains, 10 cm can be used, although the physics of granular materials may be applied to even larger objects.

The term "sorption", as used in this application is meant to include both absorption and adsorption, and includes chemisorption and physisorption.

The term "wellhead" is used in this application is mean to include a component at the surface of a gas well that provides a structural and pressure-containing interface for drilling and production equipment, and to include an optional assembly of valves, spools, and/or fittings at a surface for a gas well (a "tree"), including for surface and subsea wells.

The invention relates to gas well deliquification. This generally relates to removal of liquid components from a natural gas well. Accordingly, the method is generally used for mitigation and/or prevention of liquid loading of gas wells. Typical liquids to be removed include water and condensed hydrocarbons, for example as are naturally present in gas wells. The liquid can be present in the gas well for example as liquid films on a gas well wall, or settled on the bottom of the well tubing. In an embodiment, the liquid comprises water.

The method of the invention can be used in combination with other gas deliquification methods, if so desired. For example the method can be combined with intermittent operation or a velocity string or gas lift.

In a first step, granular sorbent material is introduced into a gas well. The gas well comprises the liquid to be removed and/or vapor thereof. Typically, the gas well is subject to liquid loading or at risk of liquid loading. The granular sorbent material can be introduced into the gas well at any position. For example, a precursor of the granular sorbent material can be introduced at the gas wellhead, transported down to the gas well bottom, where the precursor is converted into granular sorbent material that is thereby introduced into the gas well at the bottom. The granular sorbent material can be introduced batch-wise and/or continuously. Continuously introducing the sorbent material may involve introducing the material via a small inner string tube. The granular sorbent material is accordingly typically brought in contact with the gas flow in the gas well. As the gas flow typically comprises vapor of the liquid, sorbent material is also contacted with such vapor. The granular sorbent material may also be introduced directly into liquid. Granular sorbent material is preferably introduced as separate, discrete and non-cohesive grains.

Typically, granular sorbent material or a precursor thereof is provided at a wellhead of a gas well and introduced into the gas well bore at the top. The method then comprises transport of the granular sorbent material, or a precursor thereof, downward in the gas well from the top.

In a preferred method, sorbent material is provided in a separate piping such as a small inner string tube, and transported downward from the wellhead to the bottom in this piping. The piping is preferably provided with one or more openings to the bore at depths where the sorbent material is to be introduced into the bore. Such openings allow sorbent material to be brought in contact with the gas flow and/or liquid. For example, the piping may comprise openings for sorbent material at depths that differ by 5 m or more, 10 m or more, preferably 50 m or more, and may include further openings for sorbent material between the openings with such different depths. In this separate piping, preferably a gas flow is maintained that is different from the gas flow in the well bore. The gas flow in the injection piping allows for downward transport of the sorbent material.

Accordingly, a preferred step of introducing granular sorbent material in the gas well comprises transport of granular sorbent material downward in an inner string tube, preferably separate from the main bore, wherein the string tube comprises openings for introducing the granular sorbent material in the gas well bore.

Another preferred method of introducing the sorbent material is introducing a precursor of the material. The precursor can be converted into granular sorbent material at some depth in the gas well. The precursor can be transported from the wellhead down in separate piping or in the main bore. The granular sorbent material can accordingly be generated in situ in the gas well, for example at a depth where liquid to be removed is present, for example by a chemical reaction of one or more precursor reactants.

In a preferred method, the granular sorbent material is introduced in agglomerated form, for example a lump, comprising granules of the granular sorbent material hold together by a binder, preferably a lump comprising 50 g or more of sorbent material, more preferably 100 g or more, for example with a lump size of 5 cm or more, preferably 10 cm or more. The binder preferably is chosen such that the individual granules are released prior to or upon contact with the liquid. The binder may, for example, be at least partly soluble in the liquid. Dissolving the binder in the gas well may yield granular sorbent material that can be lifted by the gas flow when wetted. The binder can also be provided as a water-soluble coating, for example around granules or around the agglomerated form. Generally, the binder provides for a mechanical rigidity of agglomerated sorbent material, for instance a lump of sorbent material. Accordingly, the binder can contribute to downward transport of the sorbent material. Suitable binders include various starches, for instance dextrin, or cellulose polymer, or other water-soluble adhesives. Binder material around and/or between particles is preferably adhesive. A binder material layer around an agglomeration can, for instance, comprise a water-soluble polymer, for example it may act as a closed packaging. Such packaging material of a lump of sorbent material is not necessarily adhesive to the sorbent materials. For example, dissolution of at least part of the packaging upon contact with the liquid may allow for disintegration of the packaging and release of the sorbent material in it.

The method further comprises contacting sorbent material with liquid and/or vapor thereof. This contacting is typically carried out in the gas well at the depths where the liquid has accumulated. Suitably, at least part of the sorbent material is contacted with liquid and/or vapor thereof.

Preferably, contacting of the sorbent material with liquid involves contacting sorbent material with liquid films, typically film of liquid on a wall of the gas well. Saturated granules of the sorbent material are typically transported from a liquid film by the gas stream.

The liquid component to which the deliquification is directed can also be described as a high boiling point component, irrespective of the physical state of this component as liquid or vapor. The high boiling point component typically can have a boiling point of 20° C. or more, such as 50° C. or more, or 80° C. or more, at the relevant pressures in the gas well. Typically, a high boiling point component can have a boiling point above the temperature in the gas well at the pressure maintained in the gas well, for instance, at least 20° C. higher, or at least 50° C. higher. An example of such a high boiling point component is water. Components that can condensate and accumulate as liquid at the temperatures and pressures maintained in the gas well are further examples of such high boiling point components.

The method may comprise contacting sorbent material with vapor of a high boiling point component in the gas flow. By reducing in this way the high boiling point component vapor content in the gas flow, in particular by water drying the gas flow, condensation of the high boiling point component can be prevented and/or mitigated. The reduced vapor content may also promote evaporation of the high boiling point component from liquid films thereof, such as on walls of the gas well. The sorbent material can, for example, be exposed to the vapor while the sorbent material is lifted up by the gas flow.

In a preferred method, the gas well comprises a liquid film on a wall of the gas well of liquid to be removed. Preferably, granular sorbent material is contacted with said liquid film, thereby causing sorption of at least part of said liquid by said granular sorbent material. Preferably, at least part of the granular sorbent material is immersed in the liquid film. Preferably, granular sorbent material with liquid sorbed therein is lifted, at least partly by the gas stream, to a wellhead of said gas well.

Typically, contact between sorbent material and liquid and/or vapor thereof, results in sorption of at least part of the liquid and/or vapor thereof by the sorbent material. Such sorption may include adsorption and/or absorption of the liquid and/or vapor thereof by the sorbent material. Typically, sorbent materials based on adsorption are porous and preferably have a high specific internal surface area, for example of 50 m$^2$/kg sorbent material or more, or 100 m$^2$/kg sorbent material or more, allowing for adsorption in internal pores of the material. The sorption is preferably reversible and preferably based on physisorption.

The sorption process yields granular sorbent material with sorbed liquid and/or vapor thereof in and/or on the sorbent material. Preferably, the sorption yields sorbent material with sorbed liquid in and/or on the sorbent material. Such sorbent material can be referred to as "wetted sorbent material".

The method further comprises lifting of granular sorbent material with sorbed liquid and/or vapor thereof, at least partly by the gas stream. Lifting is typically towards a wellhead of said gas well. Lifting typically comprises transport of granular sorbent material with sorbed liquid and/or vapor thereof upwards in the gas well, i.e. in the direction of increasing gravitational energy. The method accordingly preferably provides a gas flow comprising wetted sorbent material. Typically, wetted sorbent particles are lifted up by the drag of the gas flow.

The lifting of granular sorbent material by the gas stream can be predicted based on the Turner criterion for lifting of a particle by a gas stream:

$$F_d > F_g \quad (1)$$

$F_d$ is the lifting force, which is given by:

$$F_d = \tfrac{1}{2} C_D \rho g u^2 A \quad (2)$$

wherein $C_D$ is the drag coefficient, $\rho$ is the mass density of the gas flow, g is the gravitational constant, u is the velocity of the particle relative to the gas flow and A is the reference surface area of the particle. $F_g$ is the gravitational force, which is given by:

$$F_g = 4/3 \pi r_p^3 g \Delta \rho \quad (3)$$

wherein $r_p$ is the radius of the particle, g is the gravitational constant, and $\Delta \rho$ is the difference in mass density between the particle and the gas flow.

Often, a 20% correction factor is applied for calculating the minimal gas velocity required to lift a particle.

Accordingly, preferably the method comprises receiving granular sorbent material with sorbed liquid and/or vapor thereof at a wellhead of said gas well. Preferably, 80 wt. % or more of the introduced granular sorbent material (based on dry weight) is recovered at the wellhead. Preferably, granular sorbent material recovered at the well heat comprises 10 wt. % or more of sorbed liquid and/or vapor thereof, based on dry weight (desorbed weight) of the granular sorbent material, more preferably 50 wt. % or more, even more preferably 100 wt. % or more, such as 200 wt. % or more, and in particular such amounts of sorbed liquid.

Preferably, the method comprises separating granular sorbent material from the gas stream at or downstream of the wellhead. The wet granular sorbent material is lifted up to the wellhead by the gas stream and preferably is separated from this gas stream. Suitable methods for such separation include filtration using filters. For ease of separation, the granular sorbent material is preferably not too small, such as having an average particle size of 150 µm or more, for example 250 µm or more, or 500 µm or more (for example measured as 50 wt. % retention with sieving analysis).

Other suitable separation methods include inertia based separation methods, such by sharp turns in the direction of the gas flow piping, baffles, centrifugal particle collectors, and cyclonic and multi-cyclone separation.

The method accordingly provides as advantage that separation of solid particles from a gaseous stream is relatively straightforward and easier than separating foam from liquid.

Preferably, the separated granular sorbent material is regenerated at least in part. Regeneration of the wet sorbent material typically comprises desorption of at least part of the sorbed components, in particular sorbed liquid and/or vapor thereof. This can be caused by, for example, evaporation of at least part of the sorbed liquid, such as by heating the sorbent material, typically while the hot sorbent material is exposed to a drying flow of for example hot and dry air. Typically, the sorption capacity of a sorbent material decreases by increasing the temperature, and this can add to the effect of heating sorbents during the regeneration process. Accordingly, regeneration typically involves drying the sorbent material. The method optionally comprises recovery of evaporated liquid by condensation. Preferably, the method comprises heat recovery from heated sorbent material and the drying stream, for example by heat exchange with the sorbent material to be regenerated. In case of an offshore gas well, regeneration can be carried out in an offshore regeneration unit or onshore. For an offshore gas well, the method typically comprises transport of separated sorbent material from an offshore separation unit to an onshore regeneration unit.

In some cases, the desorbed liquid from wet sorbents during the regeneration may contain both water and hydrocarbons. Accordingly, the method preferably comprises separation of at least some hydrocarbons from recovered liquid. This provides as advantage that the separated hydrocarbon may be added to the production line and the recovered liquid can be disposed of with less environmental issues. Preferably, regenerated sorbent material is used at least in part again, for example in the gas well deliquification method. Regenerated sorbent material may, for instance, be introduced in a gas well.

Therefore, the method preferably comprises regenerating at least part of the separated granular sorbent material by desorption of at least part of said liquid and reusing at least part of the regenerated granular sorbent material, in particular for gas well deliquification. The method may, for example, comprise reintroducing regenerated granular sorbent material into the gas well.

In order to provide a very effective lift of liquid, the granular sorbent material preferably has a high sorption capacity for the liquid, such that only a small mass of sorbent material has to be additionally lifted in order to lift a given amount of the liquid. In addition, the granular sorbent material preferably has a high external surface area per mass of sorbent material, such that the gas flow can provide a high drag force to effectively lift wetted granular sorbent material.

Preferably, the granular sorbent material has a sorption capacity for the liquid of at least 0.2 kg liquid/kg sorbent material, such as at least 0.5 kg/kg sorbent material, at least 1.0 kg/kg sorbent material, at least 5 kg/kg sorbent material, at least 10 kg/kg sorbent material, at least 50 kg/kg sorbent material, or at least 100 kg/kg sorbent material, and most preferably at least 500 kg/kg sorbent material. The sorption capacity for the liquid can be as measured according to ASTM F 726 "Standard Test Method for Sorbent Performance of Adsorbents". For example, the sorption capacity can be measured with 5 min complete immersion in the liquid at 20° C. Preferably, the sorbent material has the same preferred sorption capacity for vapors of the liquid.

The liquid sorption capacity can be improved by modifying the structure of sorbents particles. Preferably, the sorbent material comprises hollow sorbent particles. Preferably, hollow granules of sorbent material are comprise a shell around an open volume, with a shell thickness of 50% or less, preferably 20% or less, of the particle diameter of the granule. Hollow sorbent particles can advantageously have increased sorption capacity.

Typically, the sorbent material has an external surface area of at least 1 $m^2$/kg sorbent material, preferably at least 2 $m^2$/kg sorbent material, more preferably at least 5 $m^2$/kg sorbent material, even more preferably at least 10 $m^2$/kg sorbent material, for example up to 100 $m^2$/kg sorbent material. External surface refers to the surface of the particles that can be contact with a convective gas flow. External surface area typically is the part of the particles that experiences drag of the convective gas flow over the surface of the particle. The external surface area can be obtained from the particle size distribution and density measurement, for example, as for equivalent spherical particles having the observed particle size as diameter. More preferably, the external surface area per unit weight of the sorbent material can be increased by optimising the design and material of sorbent, to the value of 100 $m^2$/kg or more.

Preferably, the sorbent material has an external surface area of 100 $m^2$/kg sorbent material or more, and a sorption capacity for the liquid of 1.0 kg liquid/kg sorbent or more.

The sorbent material is granular. Hence, the sorbent material comprises, at least when contacted with the liquid and/or vapor thereof, solid discrete grains of the sorbent material. Suitable forms include for example powders, granules and hollow spheres. Preferably, the sorbent material has an average particle size in the range of 1 μm to 5 mm, for example measured as 50 wt. % retention with sieving analysis. More preferably, the sorbent material has an average particle size of 1.5 μm to 5 mm, even more preferably 1.5 μm to 1 mm, still more preferably 10 μm to 0.5 mm. Other preferred ranges include 50 μm to 5 mm, still more preferably 0.1-5 mm, most preferably 0.2-2.5 mm. Average particle sizes smaller than 100 μm can also be determined as D50, by volume, as measured with laser diffraction, based on volume equivalent sphere diameter. The sorbent material may preferably comprise sorbent material beads with a size of 1-20 mm, for example 5-20 mm, or 5-15 mm. These sizes provide for good lift of wetted sorbent granules. Other preferred forms include sheets and ribbons, in particular for superabsorbent polymers, for example with a thickness of 2 mm or less, 1 mm or less, or preferably 0.5 mm or less.

It is further preferred that the sorbent material has relatively low density. This can be advantageous in terms of lowering the pressure drop. The density of the sorbent material can, e.g., be 2000 kg/$m^3$ or less, such as 1600 kg/$m^3$ or less, or 1400 kg/$m^3$ or less.

Other preferred features of the sorbent material include high efficiency in severe conditions, such as at elevated temperatures, in brine and in condensates, etc. From an economical standpoint, it is further preferred that the sorbent material be relatively cheap.

The sorbent material preferably comprises a desiccant material, such as one or more selected from the group consisting of zeolite, silica, in particular silica gel, alumina, aluminosilicates, activated alumina clay, activated carbon, salt hydrates, in particular hydrates of alkaline oxides; or a superabsorbent polymer. More preferably, the sorbent material comprises zeolites and/or silica.

The sorbent material preferably comprises a superabsorbent polymer, for example, one or more selected from poly-acrylic acid sodium salt, polyacrylamide copolymer, ethylene maleic anhydride copolymer, cross-linked carboxymethylcellulose, polyvinyl alcohol copolymers, cross-linked polyethylene oxide, and starch grafted copolymer of polyacrylonitrile.

The sorbent material may comprise additives, for example pigments, dyes, adhesion promoters, surfactants, and heat and/or ultraviolet light stabilisers.

The sorbent material preferably does not dissolve in the liquid. Preferably, structural rigidity of the sorbent material is maintained upon contact with the liquid. For example, salt hydrates, such as calcium chloride and magnesium sulphate and hydrates thereof, are not preferred as granular sorbent material, because despite their liquid sorption capacity, they dissolve upon the saturation.

Preferred zeolite materials include zeolite A, zeolite X, zeolite Y, and zeolite L, in particular for example zeolite 3A, zeolite 4A, zeolite 5A, zeolite 10X, and zeolite 13X. These zeolite materials provide as advantage that they work as sorbent in saline water.

Further sorbent materials include hydrophilic sponges, such as Metal-Organic Frameworks (MOFs) of various kinds and cellulose fibre based particles. Highly preferred sorbent materials include zeolite beads of zeolite with 3-5 Å pores, including commercially available zeolite beads with typical size of 1-5 mm. Zeolite beads can be manufactured at different sizes ranging from micron meters to millimeters.

In a preferred method, the sorbent materials are pretreated prior to introduction into the gas well, for example dehydration. Preferably, the sorbent material is introduced into the gas well in a dehydrated form, in particular in case of zeolites.

An advantage of using zeolite as sorbent material is the relatively high heat of absorption, of typically about 600 kJ/kg absorbed liquid. Accordingly, the absorption of the liquid will cause a temperature that has a beneficial effect on production.

For zeolites, suitable precursor materials for zeolites include sodium aluminate and sodium silicate. This advantageously provides flexibility as depending on the desired properties, different ratios of the mentioned compounds can be used.

Preferably, granules of the sorbent material comprise a hygroscopic core, for example of the mentioned sorbent materials, and hydrophobic coating that is permeable to the liquid. The coating may, for instance, comprise pores to allow transport of liquid to the core. Preferably at least a majority of the external surface of the particles is covered with hydrophobic coating, rendering these parts hydrophobic. Such preferred granules provide as advantage that the sorbent material granules do not stick to each other when wetted and that clogging can be better avoided. An example of a suitable material for a hydrophobic coating is ethyl cellulose.

In a special embodiment of the invention, the granular sorbent material that is introduced in the gas well comprises a functional compound. Typically, the granular sorbent material is loaded with this functional compound by adsorption. The functional compound can be a compound that is to be delivered downhole in the gas well to locally perform its function. Hence, in accordance with this embodiment the granular sorbent has a dual function in that it delivers the compound which it comprises downhole in the gas well, and absorbs the liquid which is subsequently transported upwards to the wellhead of the gas well. The functional compound may be one or more selected from friction reducers, gelling agents, clay control systems, biocides, scale inhibitors, chelating agents, gel breakers, antifoamers, cross-linkers, wax inhibitors, anti-sludging agents, corrosion inhibitors, de-emulsifiers, foaming agents, agglomerating agents and tracers.

In a further special embodiment, the granular sorbent material comprises two or more different granular sorbent material which are introduced into the gas well, either consecutively or simultaneously as a mixture. The granular sorbent material may differ in one or more selected from type, pore size, coating, and the like. The different granular sorbent materials will typically have different sorption characteristics and thereby cause a selective sorption of one or more specific species. In this way, it is possible to attract a specific species downhole in the gas well and/or separate different species downhole.

A further aspect relates to an installation for gas well deliquification, preferably according to the method of the invention, comprising:
  an inner string tube in a bore of a gas well, for downward transport of granular sorbent material or a precursor thereof through the tube, wherein the tube is provided with at least one opening to the gas bore for release of granular sorbent material or a precursor thereof to the gas flow,
  a wellhead unit connected to said bore, for receiving a gas flow comprising natural gas produced in the gas well and granular sorbent material lifted up by said gas flow, and
  a separation unit in connection for the gas stream to the wellhead unit for separating granular sorbent material from the gas stream.

Preferably, the installation comprises in addition
  a regeneration unit connected with the separation unit to receive granular sorbent material separated from the gas stream and to regenerate granular sorbent material by desorbing sorbed liquid components from the granular sorbent material, said regeneration unit comprising heaters to heat the sorbent material and an inlet and an outlet for an air flow, and a space for contacting granular sorbent material with said air flow, and
  a connection between the regeneration unit to the inners string tube for introducing regenerated sorbent material into the inner string tube.

This installation can be used for particular preferred methods of the invention. The regeneration unit may in addition comprise heat exchangers for heat exchange of the sorbent material to be heated with hot dry sorbent material and/or desorbed vapor produced in the regeneration unit. The wellhead unit is typically at the surface of the gas well providing a structural and pressure-containing interface for drilling and/or production equipment. The wellhead can be on shore, on a product platform, or can be a subsea or mud line wellhead. The installation comprises the usual pressure equipment as required.

Preferably, the inner string tube comprises two or more openings to the gas bore at depths differing by 5 m or more, preferably 10 m or more, preferably openings at three or more depths differing by 10 m or more. This allows for a more effective removal, and/or prevention of clogging and building up, of liquid film over a larger depth. Preferably, the inner string tube comprises openings for sorbent material at depths that differ by 5 m or more, 10 m or more, preferably 50 m or more, and may include further openings for sorbent material between the openings with such different depths.

In yet a further aspect, the invention relates to use of a granular sorbent material, preferably as described herein as gas well deliquifier, preferably in a method of gas deliquification as described herein. Use of granular sorbent material as gas well deliquifier includes for example use of the sorbent materials to improve transport of liquid components in a gas well that contains these liquid components or is subject and/or at risk of liquid loading by such liquid components, in particular water.

In yet a further aspect, the invention is directed to the use of a granular sorbent material as production stabiliser, preferably in a gas well. It was surprisingly found that the granular sorbent material by adsorbing liquid content is able to by mitigating instabilities caused by the gas-liquid interaction, such as slugs. Most of the instabilities in gas-liquid systems are initiated from the interfacial phenomena between gas and liquids.

In yet a further aspect, the invention is directed to the use of a granular sorbent material as scale inhibitor, preferably in a gas well. The granular sorbent material by adsorbing minerals dissolved in the brine, is able to mitigating scale or salt formation.

DETAILED DESCRIPTION OF THE INVENTION

FIG. 1 shows a schematic illustration of an example of a method of the invention. In gas well 1, a schematic overview of a subterranean part of main bore 2 is shown, comprising wall 3 of the bore and a liquid film 4. Sorbents 5 are introduced 9 into injection piping 7 and transported down to opening 8 in piping 7 for injection of sorbent 5 in main bore 2. Sorbent particles 5 are brought in contact with gas flow 6. Some sorbent particles 5 transport in liquid 4, thereby providing sorbent particles 13 in contact with liquid 4. Wetted sorbent particles 13 are transported 14 from liquid film 4 into gas flow 6. Transport 14 can for example occur by full sorption of liquid film or partial sorption. In some embodiments, particles can stay in contact with the liquid film 4 until region C, in which there is no liquid film available. The particles are then transported up in direction 15 towards the head of the gas well (not shown). Other sorbent particles 5 remain in gas flow 6 and absorb vapor of liquid film 4. Below the level where sorbent is injected at 8, a liquid film 10 is present, sorption process 11 occurs at some height above the sorbent injection, resulting in no liquid film at 12. In part A of the gas well, a liquid film is present, in part B, the sorption process occurs, in part C, with the smallest depth (distance from the wellhead), no liquid film is present.

Figure 2:
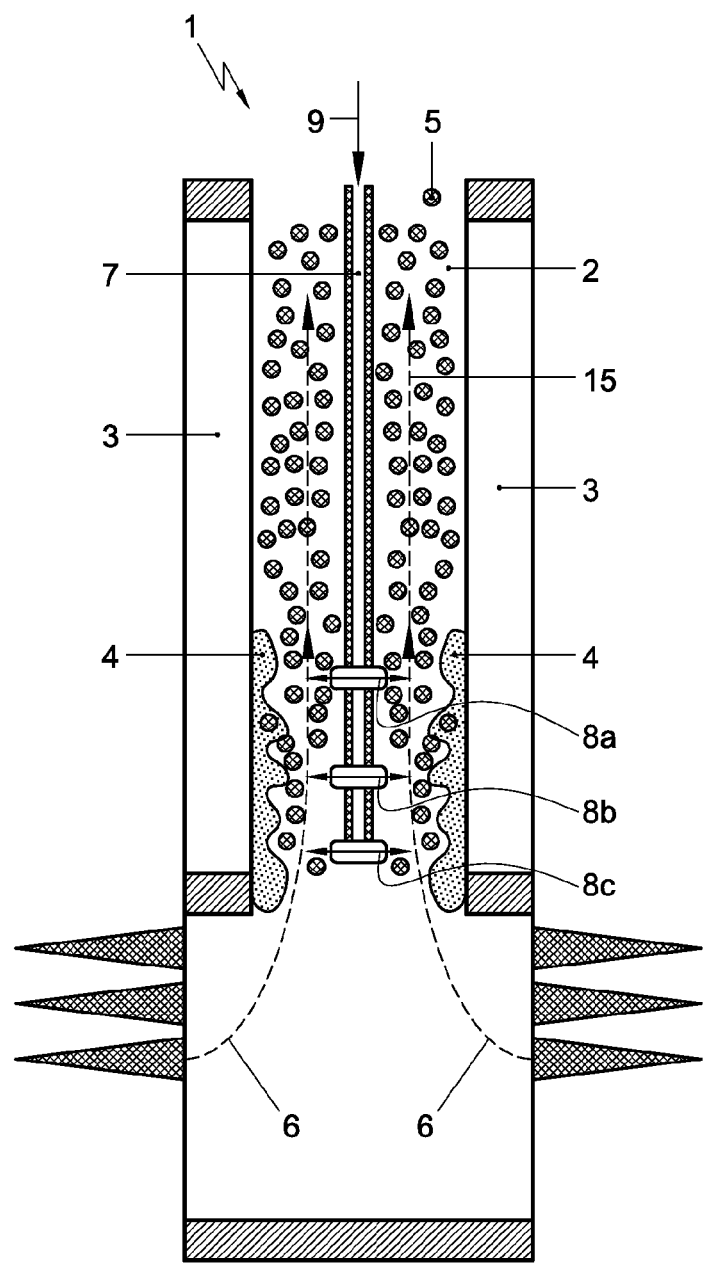
FIG. 2 is a second schematic illustration of a gas well during a process in accordance with the invention.

FIG. 2 shows a schematic illustration of an example of method according to the invention. In gas well 1, sorbent 5 is introduced at 9 in injection piping 7 (or inner string tube 7) and injected into main bore 2 at injection points 8a, 8b and 8c at different depths. Sorbent particles 5 are contacted with liquid 4 on the walls 3 of the main bore 2 and are lifted upwards 15 by gas flow 6.

Figure 3A:
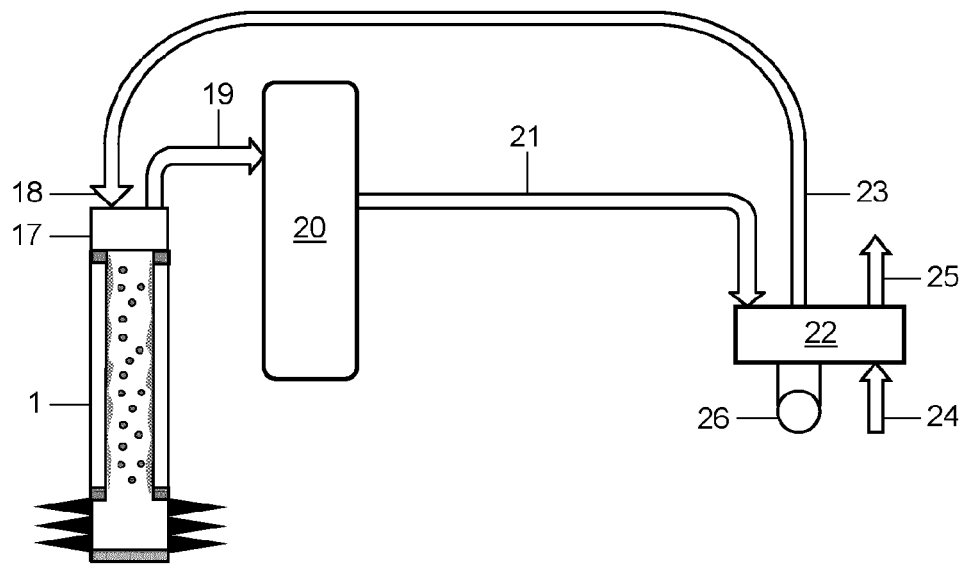
FIG. 3a is a schematic illustration of a process in accordance with the invention showing sorbent being introduced into a gas well.

FIG. 3A shows a schematic process scheme of an example of a method of the invention. At wellhead 17 of gas well 1, sorbent is introduced 18 into the gas well, for example by an inner string tube. Wellhead unit 17 receives a gas flow from gas well 1 that comprises natural gas and granular sorbent material lifted up by said gas flow. Wellhead unit 17 is provided with connection 19 for a gas stream comprising granular sorbent material to separation unit 20 for separating of granular sorbent material from the gas stream. Separation unit 20 is provided with connection 21 for granular sorbent material to regeneration unit 22 for regenerating granular sorbent material, for example by desorbing sorbed liquid components from the granular sorbent material. For that purpose, regeneration unit 22 is provided with heater 26 to heat the sorbent material and an inlet 24 and an outlet 25 for a drying air flow. Regeneration unit 22 is provided with a connection 23 for regenerated granular sorbent material with wellhead unit 17 for reintroducing the regenerated sorbent material at 18.

Figure 3B:
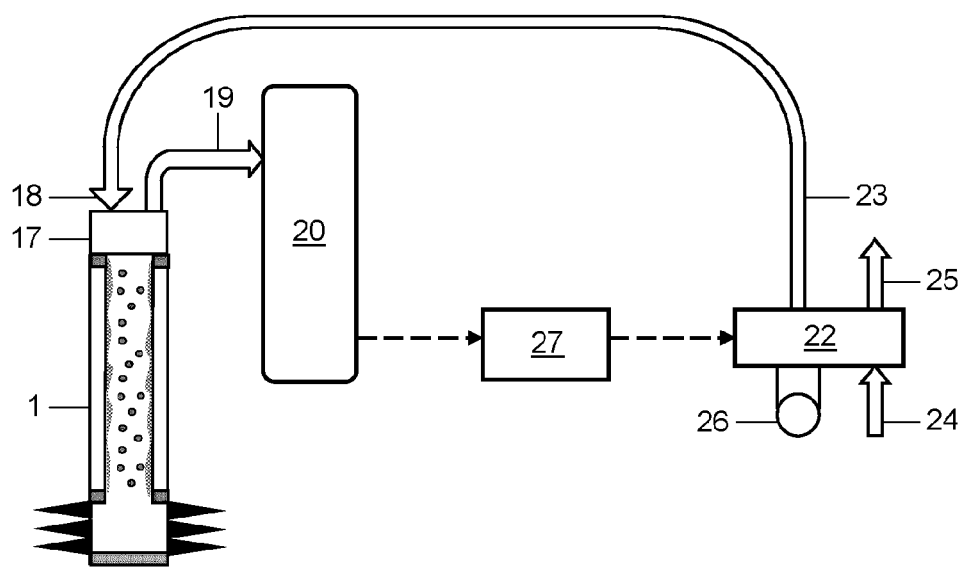
FIG. 3b is a schematic illustration of a process depicting an offshore gas well and a regeneration unit at a second location.

FIG. 3B shows a modification of the process of FIG. 3A, wherein gas well 1 is offshore and regeneration unit 22 is at a different location, for example on shore. Instead of connection 21, a transporter 27 is used, for example a ship.

The invention will now be further illustrated by the following non-limiting examples.

EXAMPLES

Example 1

In example 1, the critical rate for liquid loading of a gas well was estimated for sorbents of different sizes and it is compared to the cases in which no mitigation technique and foamer was used. The critical rate was calculated based on Turner criterion. The profit per well was estimated based on the assumption for the profit of €0.1 per 1 m$^3$ of the produced gas.

An estimated comparison of exemplary methods according to the invention and gas well deliquification using foamers was as follows:

TABLE 1

| Mitigation technique | Critical flow rate [Sm$^3$/day] | Profit per well [million Euro/ 3 year] | Raw material | Downstream devices |
|---|---|---|---|---|
| No mitigation | 62500 | — | — | — |
| Foamer | 45900 | 3 | Small amount, not reused | Emulsion separator |
| Sorbents (5 mm) | 65700 | — | Large amount, can be regenerated and reused | Solids separator, regenerator |
| Sorbents (2 mm) | 41500 | 3.8 | | |
| Sorbents (0.1 mm) | 9290 | 6.8 | | |

Example 2

In example 2, the effectiveness of a sorbent for a liquid loaded gas well was analysed. The analysis was done based on a graph in which the well bottom hole pressure for different gas flow rates is given. The minimum of the mentioned plot, was used for determining the liquid loading point. The gas well in example 2 has a top hole pressure of 10 bars, with liquid-gas ratio of 50 m$^3$/MSm$^3$. The inner diameter and length of the well is 10.16 cm and 3000 m, respectively. The liquid sorption capacity of 0.2 kg water/kg sorbents is assumed, a typical value for zeolites in atmospheric conditions. The absorbed liquid has been added to the density of the granular sorbent material. Sorbent granules have spherical shape and their diameter was from 0.1-5 mm.

The bottom hole pressure has decreased at high gas flow rates with sorbents. The minimum of the bottom hole pressure occurs at higher gas flow rates than without using sorbents, for larger sorbents granules. Sorbent of 0.1 mm and smaller can decrease the flow rates in which the minimum of pressure drop occurs.

Figure 4:
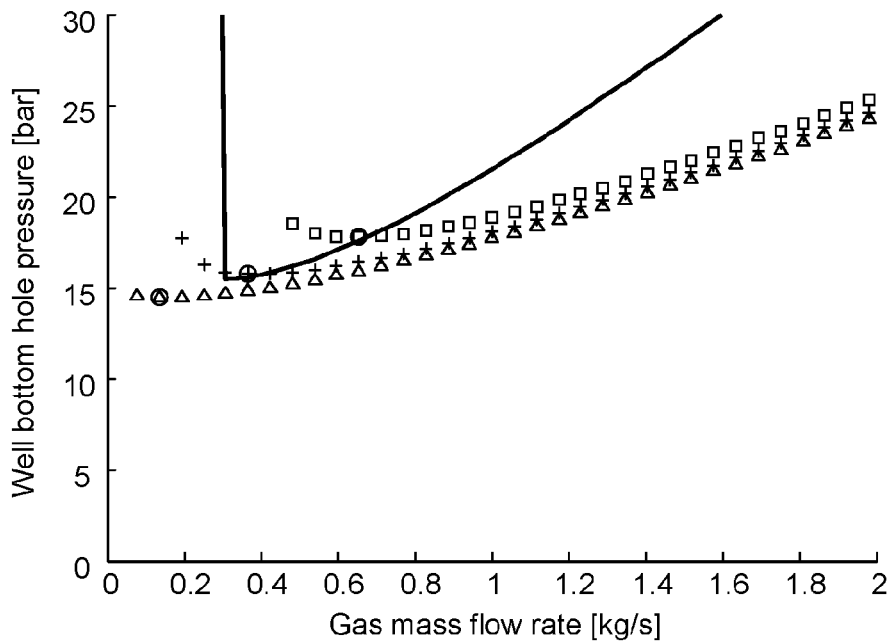
FIG. 4 is a first graph illustrating data generated in Example 2.

FIG. 4 shows the effects of sorbents on the well bottom hole pressure for different gas mass flow rate. The solid line: no sorbents, squares (□): with sorbents of 5 mm diameter, crosses (+): with sorbents of 1 mm diameter, triangles (Δ): with sorbents of 0.1 mm diameter, ○: minimum of bottom hole pressure. Heat generation of sorbents is neglected.

Figure 5:
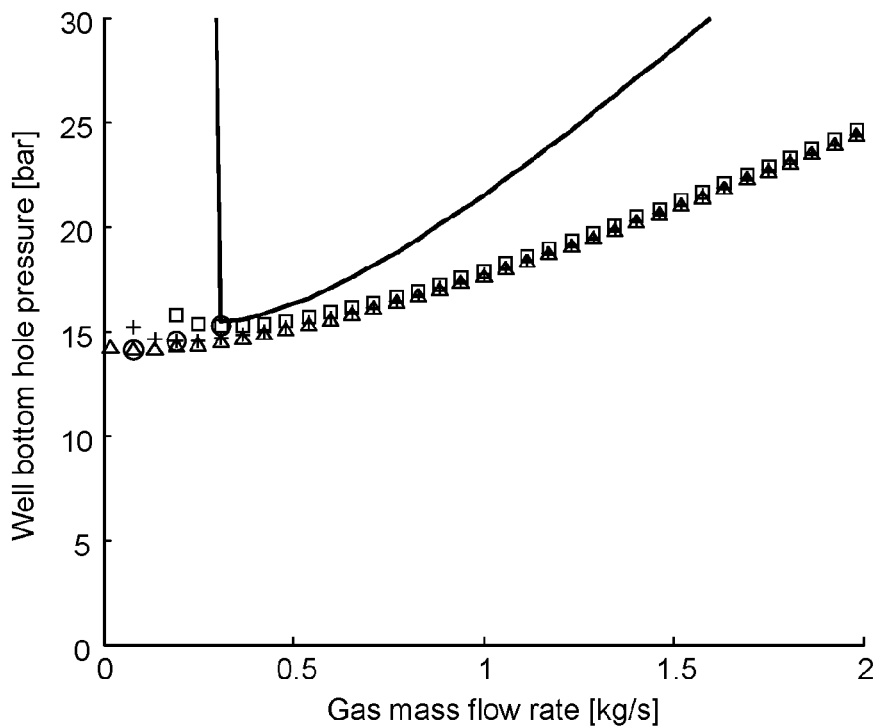
FIG. 5 is a second graph illustrating data generated in Example 2.

FIG. 5 shows the effectiveness of hollow granules for deliquification. For this analysis, the effective density of sorbents is reduced by a factor of 10. Liquid loading onset occurs at lower gas flow rate, even for 5 mm granules. Solid line: no sorbents, squares (□): with sorbents of 5 mm diameter, crosses (+): with sorbents of 1 mm diameter, triangles (Δ): with sorbents of 0.1 mm diameter, ○: minimum of bottom hole pressure. Heat generation of sorbents is neglected.

Example 3

In example 3, the benefits of injecting different type of sorbents to a gas well were compared. The results are given in table 2. The well in example 3 has the top and bottom hole pressure of 10 and 50 bars, respectively. The gas production is assumed to be 80 000 $Sm^3/d$ with liquid-gas ratio of 50 $m^3/MSm^3$.

TABLE 2

| Compound | Water capacity [kg water/ kg sorbent] | Regeneration temperature range [° C.] | Amount needed to remove 4 $m^3$ water [ton] | Material price for removal of 4 $m^3$ water [k€] |
|---|---|---|---|---|
| Zeolite 3A | 0.19-0.20 | ≤400 | 40.0-42.1 | 20-151.6 |
| Zeolite 4A | 0.20-0.21 | ≤400 | 38.1-40.0 | 3.8-120 |
| Zeolite 5A | 0.20-0.22 | ≤400 | 36.3-40.0 | 14.5-144 |
| Zeolite 10X | 0.23-0.24 | ≤400 | 33.3-34.7 | 20.0-124.9 |
| Zeolite 13X | 0.23-0.26 | ≤400 | 30.8-34.7 | 3.1-124.9 |
| Silica gel | ~0.3-1.2 | ≤150 | 50-200 | 5-50 |
| Activated carbon | 0.27-0.45 | ≤105 | 222-370 | 22.2-1480 |
| Metal-organic framework (MOF) | ≥1.2 | ≤80 | ∞[1] | ∞[2] |
| Salt hydrate (e.g. $CaCl_2$, $MgSO_4$) | 0.5 | 60-250 | 12 | 1.4[3] |
| Super absorbing polymer | 50-500 | ≤130 | 0.16-1.6 | 0.2-7.7[4] |

[1]Based on low dehydration temperatures, no water sorption remains at high temperature.
[2]No more water binding capacity, and is hence not preferred.
[3]Values for $CaCl_2$. This absorbent dissolves, and is hence not preferred.
[4]Values for sodium polyacrylate. This specific polymer causes clogs, and is hence not preferred.

The term "comprising" includes, but is not limited to, the cases of "containing with optionally one or more other components", "consisting essentially of" and "consisting of". For the purpose of clarity and a concise description features are described herein as part of the same or separate embodiments and/or aspects, however, it will be appreciated that the scope of the invention may include embodiments and/or aspects having combinations of all or some of the features described.

The invention claimed is:

1. Gas well deliquification method, comprising
introducing granular sorbent material in a gas well comprising liquid to be removed and/or vapor thereof,
contacting said granular sorbent material with said liquid and/or vapor thereof in said gas well, thereby causing sorption of at least part of said liquid and/or vapor thereof by said granular sorbent material, and
lifting of said granular sorbent material with sorbed liquid and/or vapor thereof at least partly by the gas stream to a wellhead of said gas well.

2. Method according to claim 1, wherein said granular sorbent material has a sorption capacity for the liquid of 0.2 kg liquid/kg sorbent material to 500 kg liquid/kg sorbent material.

3. Method according to claim 1, wherein said granular sorbent material has a sorption capacity for the liquid of 0.5 kg liquid/kg sorbent material to 500 kg liquid/kg sorbent material.

4. Method according to claim 1, wherein said granular sorbent material has a sorption capacity for the liquid of 1.0 kg liquid/kg sorbent material to 500 kg liquid/kg sorbent material.

5. Method according to claim 1, wherein said granular sorbent material has an external surface area of 1 $m^2$/kg to 100 $m^2$/kg.

6. Method according to claim 1, wherein said granular sorbent material has an external surface area of 10 $m^2$/kg to 100 $m^2$/kg.

7. Method according to claim 1, wherein said granular sorbent material has an average particle size of 1 μm to 5 mm.

8. Method according to claim 1, wherein said granular sorbent material has an average particle size of 1.5 μm to 1 mm.

9. Method according to claim 1, wherein said granular sorbent material has an average particle size of 10 μm to 0.5 mm.

10. Method according to claim 1, wherein said granular sorbent material comprises sorbent material beads with a size of 5-20 mm.

11. Method according to claim 1, wherein said granular sorbent material comprises one or more selected from the group consisting of zeolites, silica, alumina, aluminosilicates, activated alumina clay, activated carbons, salt hydrates, and superabsorbent polymers.

12. Method according to claim 1, wherein said granular sorbent material comprises granules comprising a hygroscopic core and a hydrophobic coating that is permeable for the liquid.

13. Method according to claim 1, wherein said granular sorbent material comprises zeolite.

14. Method according to claim 1, wherein said granular sorbent material comprises silica.

15. Method according to claim 1, wherein said granular sorbent material when being introduced in the gas well comprises a functional compound sorbed to said granular sorbent material,
wherein said functional compound is one or more selected from the group consisting of friction reducers, gelling agents, clay control systems, biocides, scale inhibitors, chelating agents, gel breakers, antifoamers, cross linkers, wax inhibitors, anti-sludging agents, corrosion inhibitors, de-emulsifiers, foaming agents, agglomerating agents and tracers.

16. Method according to claim 1, wherein said step of introducing granular sorbent material in the gas well comprises transport of granular sorbent material downward in an inner string tube, wherein the string tube comprises openings for introducing the granular sorbent material in the gas well bore.

17. Method according to claim 1, wherein the method comprises separating the granular sorbent material from the gas stream at or downstream of the wellhead.

18. Method according to claim 17, wherein the method further comprises regenerating separated granular sorbent material by desorption of at least part of said liquid and reusing regenerated granular sorbent material at least in part for gas well deliquification.

19. Method according to claim 1, wherein said gas well comprises a liquid film on a wall of the gas well of liquid to be removed, wherein said granular sorbent material is contacted with said liquid film, thereby causing sorption of at least part of said liquid by said granular sorbent material, and wherein granular sorbent material with liquid sorbed therein is lifted, at least partly by the gas stream, to a wellhead of said gas well.

20. Installation for gas well deliquification, comprising:
a supply of granular sorbent material for injection into a gas well,
an inner string tube in a bore of the gas well, for downward transport of granular sorbent material through the tube, wherein the tube is provided with at least one opening to the gas bore for release of granular sorbent material to the gas flow,
a wellhead unit connected to said bore, for receiving a gas flow comprising natural gas produced in the gas well and granular sorbent material lifted up by said gas flow, and
a separation unit in connection for the gas stream to the wellhead unit for separating granular sorbent material from the gas stream, comprising separate outlets for a gas product stream and separated granular sorbent material.

21. Installation according to claim 20, comprising
a regeneration unit connected with the separation unit to receive granular sorbent material separated from the gas stream and to regenerate granular sorbent material by desorbing sorbed liquid components from the granular sorbent material, said regeneration unit comprising heaters to heat the sorbent material and an inlet and an outlet for an air flow, and a space for contacting granular sorbent material with said air flow, and
a connection between the regeneration unit to the inners string tube for introducing regenerated sorbent material into the inner string tube.

* * * * *